US011772446B2

(12) United States Patent
Corno et al.

(10) Patent No.: US 11,772,446 B2
(45) Date of Patent: Oct. 3, 2023

(54) SYSTEM AND METHOD FOR CONTROLLING THE STABILITY OF A VEHICLE PROVIDED WITH A SEMI-ACTIVE SUSPENSION

(71) Applicant: AUTOMOBILI LAMBORGHINI S.P.A., Sant'Agata Bolognese (IT)

(72) Inventors: Matteo Corno, Milan (IT); Sergio Matteo Savaresi, Cremona (IT); Giulio Panzani, Monza (IT); Olga Galluppi, Florence (IT); Jacopo Cecconi, Bologna (IT); Andrea Sinigaglia, Bologna (IT)

(73) Assignee: AUTOMOBILI LAMBORGHINI S.P.A., Sant'agata Bolognese (IT)

( * ) Notice: Subject to any disclaimer, the term of this patent is extended or adjusted under 35 U.S.C. 154(b) by 113 days.

(21) Appl. No.: 17/602,190

(22) PCT Filed: Apr. 8, 2020

(86) PCT No.: PCT/IB2020/053341
§ 371 (c)(1),
(2) Date: Oct. 7, 2021

(87) PCT Pub. No.: WO2020/208538
PCT Pub. Date: Oct. 15, 2020

(65) Prior Publication Data
US 2022/0212514 A1 Jul. 7, 2022

(30) Foreign Application Priority Data
Apr. 12, 2019 (IT) .................. 102019000005722

(51) Int. Cl.
*B60G 17/016* (2006.01)
*B60G 17/018* (2006.01)
(Continued)

(52) U.S. Cl.
CPC ....... *B60G 17/016* (2013.01); *B60G 17/0182* (2013.01); *B60G 17/01908* (2013.01);
(Continued)

(58) Field of Classification Search
CPC .......... B60G 17/0182; B60G 17/01908; B60G 17/08; B60G 2400/102; B60G 2400/20;
(Continued)

(56) References Cited

U.S. PATENT DOCUMENTS 10,752,075 B1 * 8/2020 Shukla .................. B60G 11/27
2006/0124413 A1 * 6/2006 Namuduri ............... F16F 9/535
188/267

(Continued)

FOREIGN PATENT DOCUMENTS

FR 2701902 A1 9/1994
GB 2260106 A 4/1993
JP 2002219921 A 8/2002

OTHER PUBLICATIONS

International Search Report and Written Opinion dated Jul. 16, 2020 from International Patent Application No. PCT/IB2020/053341.

*Primary Examiner* — Toan C To
(74) *Attorney, Agent, or Firm* — SHUTTLEWORTH & INGERSOLL, PLC; Timothy Klima

(57) ABSTRACT

A system for controlling the stability of a vehicle equipped with semi-active dampers includes: an actuator, a plurality of sensors, a low-level control unit, a high-level control unit and a mid-level control unit adapted to execute an algorithm for calculating a damping level ($C_{ref}$).

14 Claims, 3 Drawing Sheets

(51) Int. Cl.
*B60G 17/019* (2006.01)
*B60G 17/08* (2006.01)

(52) U.S. Cl.
CPC ........ *B60G 17/08* (2013.01); *B60G 2400/102* (2013.01); *B60G 2400/20* (2013.01); *B60G 2400/202* (2013.01); *B60G 2400/252* (2013.01); *B60G 2400/34* (2013.01); *B60G 2400/39* (2013.01); *B60G 2400/412* (2013.01); *B60G 2400/518* (2013.01); *B60G 2500/10* (2013.01); *B60G 2600/17* (2013.01); *B60G 2800/01* (2013.01)

(58) Field of Classification Search
CPC ........ B60G 2400/202; B60G 2400/252; B60G 2400/34; B60G 2400/39; B60G 2400/412; B60G 2400/518; B60G 2500/10; B60G 2600/17; B60G 2800/01
See application file for complete search history.

(56) References Cited

U.S. PATENT DOCUMENTS

| | | | | |
|---|---|---|---|---|
| 2008/0243334 | A1* | 10/2008 | Bujak | B60G 17/0195 701/37 |
| 2013/0253764 | A1* | 9/2013 | Kikuchi | B60G 17/016 701/38 |
| 2015/0006031 | A1* | 1/2015 | Kikuchi | B60W 30/02 701/38 |
| 2015/0046035 | A1* | 2/2015 | Kikuchi | B60G 17/0195 701/37 |
| 2016/0121924 | A1* | 5/2016 | Norstad | B60W 30/18136 701/41 |
| 2017/0129298 | A1* | 5/2017 | Lu | B60G 17/015 |
| 2018/0354336 | A1* | 12/2018 | Oakden-Graus | B60G 3/20 |
| 2020/0156430 | A1* | 5/2020 | Oakden-Graus | B60G 17/0165 |
| 2021/0138861 | A1* | 5/2021 | Laumanns | B60W 30/025 |
| 2022/0016949 | A1* | 1/2022 | Graus | B60G 17/0164 |

* cited by examiner

SYSTEM AND METHOD FOR CONTROLLING THE STABILITY OF A VEHICLE PROVIDED WITH A SEMI-ACTIVE SUSPENSION

This application is the National Phase of International Application PCT/IB2020/053341 filed Apr. 8, 2020 which designated the U.S.

This application claims priority to Italian Patent Application No. 102019000005722 filed Apr. 12, 2019, which application is incorporated by reference herein.

TECHNICAL FIELD

This invention relates to a system and a method for controlling the stability of a vehicle, specifically a system and a method for controlling the stability of a vehicle equipped with semi-active suspension.

BACKGROUND ART

Suspension systems have a large impact on the driveability and safety of a vehicle, as well as on the driver's comfort on a rough road surface.

Modern stability control systems mainly involve two types of suspensions: electronic pneumatic suspensions and semi-active suspensions.

The difference between the two types of suspensions lies in the fact that electronic pneumatic suspensions are active and capable of applying forces, whilst semi-active suspensions are passive and the resistance of the suspensions to contraction and extension can be adjusted.

Semi-active suspensions, however, have the advantage of having a higher control frequency and being less cumbersome in terms of weight and space and less energy-intensive insofar as they are passive.

Control methods known to date implement algorithms of the skyhook type, which are designed to limit as much as possible the dynamics of the damped mass that is, the vehicle body compared to the substantially undamped mass which is in contact with the ground that is, the wheels.

Based on the vertical speeds of the body and wheels, measured by specific sensors, skyhook algorithms calculate an ideal damping level that the dampers have to apply to ensure an optimal driving quality.

Most of the suspension control methods developed are based on mathematical models of the vehicle angles so as to locally attenuate the shocks caused by the irregularities of the road surface.

These systems, however, fail to control the general dynamics of the vehicle which affect vehicle stability and driving pleasure, such as, for example, the rolling and pitching dynamics determined by the steering, braking and acceleration commands given by the driver.

To control these dynamics, the prior art teaches the use of hierarchical systems where low-level controllers are used to handle individual vehicle dynamics and high-level controllers are used to determine which low-level controller is to have priority, based on predetermined logic.

Suspension control is thus managed in a sub-optimal manner since one control system takes priority over the others, whose commands are therefore ignored.

Thus, when a higher priority is assigned to the rolling and pitching control system, the commands issued by the system that controls the damping of road surface irregularities are ignored, and vice versa.

These priority-based control systems, therefore, do not ensure total, simultaneous control of vehicle dynamics, which reflects negatively on the driving comfort and road holding capability of the vehicle.

Consequently, a particularly strongly felt need in the field of vehicle stability control is that of providing total systems: that is to say, systems capable of simultaneously handling road surface irregularities and general vehicle dynamics.

Aim of the Invention

In this context, the main aim of the invention is to overcome the above-mentioned drawbacks.

Specifically, the aim of this disclosure is to propose a system for controlling the stability of a vehicle equipped with semi-active dampers and which allows simultaneously handling the oscillations caused by road surface irregularities and the vehicle rolling and pitching dynamics due to the driver's manoeuvres.

According to an aspect of this disclosure, the system for controlling the stability of a vehicle equipped with semi-active dampers comprises:
- a plurality of actuators configured to continuously regulate the damping level of the semi-active dampers;
- a first group of sensors configured to detect at least one dynamic parameter of the vehicle;
- a second group of sensors configured to capture the input from the vehicle driver;
- a high-level control unit configured to calculate a nominal damping parameter, through a model, as a function of the quantities detected by the two groups of sensors;
- at least one mid-level control unit configured to calculate, as a function of the quantities detected by the first group of sensors, the damping level to be applied by the high-level control unit to each damper through a parameterized algorithm;
- at least one low-level control unit, configured to send drive signals to the actuators of the dampers.

According to another aspect, this disclosure relates to a method or controlling the stability of a vehicle, comprising the steps of capturing dynamic parameters of the vehicle, capturing the input entered by the driver, executing an algorithm for calculating the optimum damping level to be applied to each damper the vehicle is provided with and, lastly, implementing the damping levels calculated.

BRIEF DESCRIPTION OF THE DRAWINGS

Further features and advantages of this invention are more apparent in the non-limiting description of a preferred but non-exclusive embodiment of a system for controlling the stability of a vehicle, as illustrated in the accompanying drawings, in which.

DETAILED DESCRIPTION OF PREFERRED EMBODIMENTS OF THE INVENTION

Figure 1:
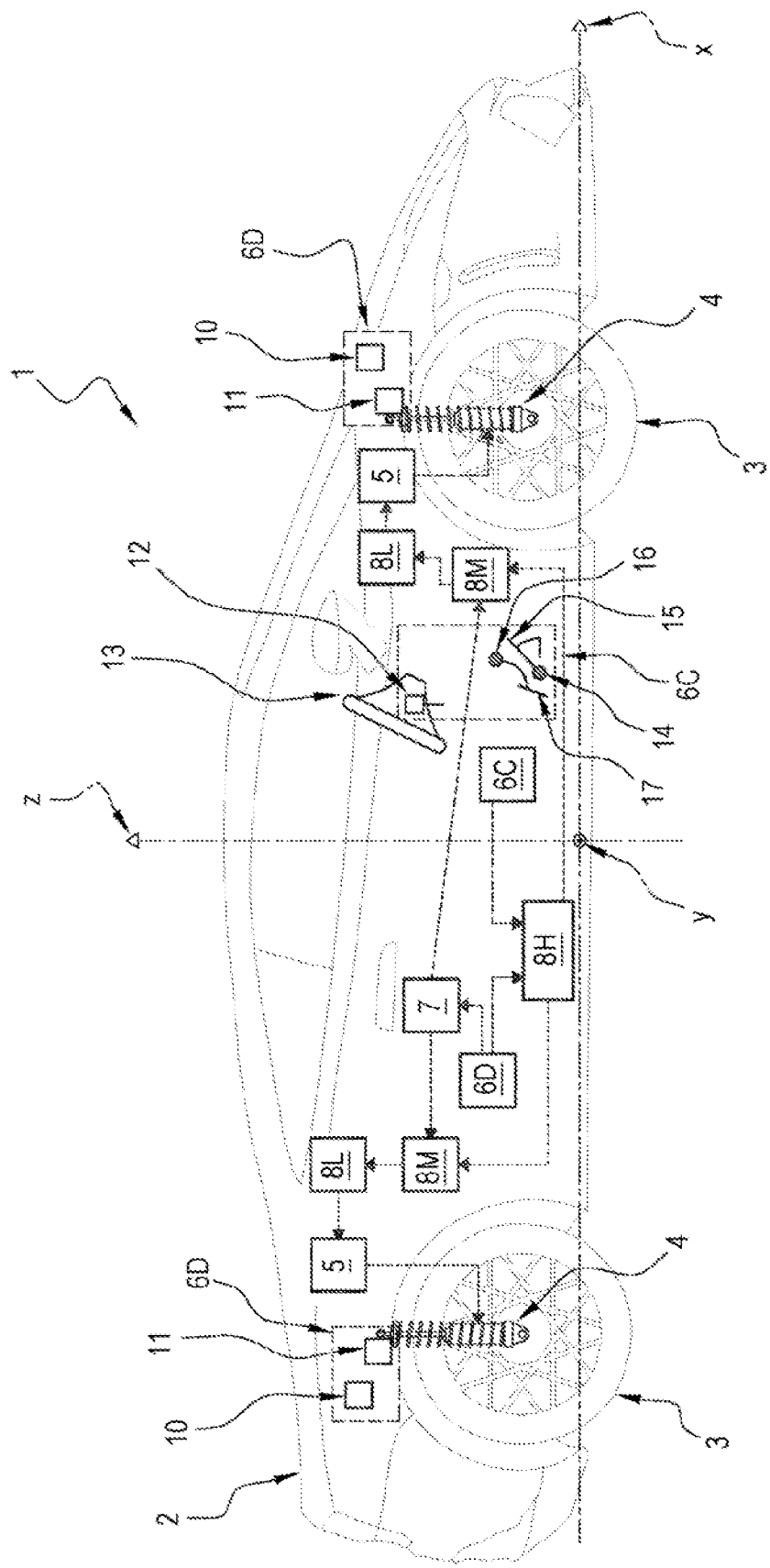
FIG. 1 shows a schematic side view of a vehicle equipped with the stability control system of this patent specification.

With specific reference to the drawings, the numeral 100 denotes a system for controlling the stability of a vehicle 1.

As illustrated, the vehicle 1 has a vehicle body 2 and a plurality of wheels 3, which are the points where the vehicle touches the ground.

Preferably, the vehicle 1 has four wheels 3.

The vehicle 1 also has a longitudinal axis of extension x, a transverse axis of extension y and a vertical axis of extension z.

The vehicle 1 further comprises at least one semi-active damper 4 for each wheel 3 the vehicle 1 is provided with; for simplicity, reference is hereinafter made only to one damper 4, since the semi-active dampers 4 are preferably all technically the same for each wheel.

The damper 4 is interposed between the respective wheel 3 and the vehicle body 2 and is configured to damp the oscillations of the vehicle body 2 along the vertical axis of extension z of the vehicle 1.

Preferably, the damper 4 has a damping level $C_{ref}$ which is adjustable continuously between a minimum damping level $C_{min}$ and a maximum damping level $C_{max}$.

In other words, the number of possible damping levels $C_{ref}$ is not finite and predetermined but settable as required within the range defined by $C_{min}$ and $C_{max}$.

Advantageously, compared to traditional skyhook systems having a finite number of adjustment levels, the fact that the damping level $C_{ref}$ can be regulated continuously allows the system 100 to have practically infinite possibilities of setting the damping level, with obvious advantages in terms of stability and driving pleasure of the vehicle 1.

In a preferred but non-limiting embodiment, the semi-active damper 4 is a magnetorheological damper: that is to say, a type of damper where the resistance to oscillations is regulated by applying a magnetic field in order to modify the fluid dynamic properties of a liquid included in the damper 4 itself.

In another embodiment, the semi-active damper 4 is an electrorheological or electrohydraulic damper.

A stability system 100 for the vehicle 1 is responsible for controlling and driving the damper 4 of the vehicle 1, in order to limit the oscillations of the vehicle body 2 along the vertical axis of extension z, thus ensuring optimum comfort for the driver of the vehicle 1.

Figure 2:
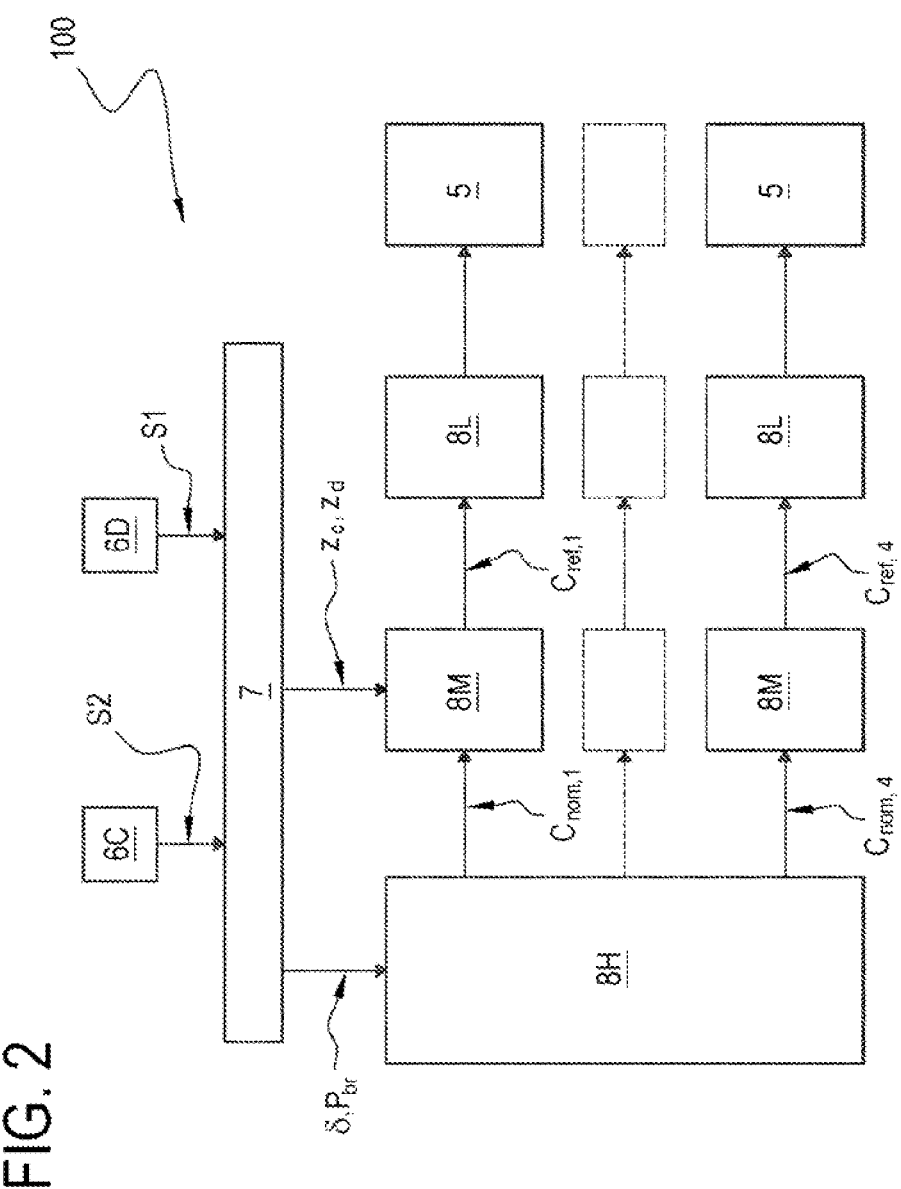
FIG. 2 schematically illustrates a detail of the stability control system of FIG. 1.

As illustrated in FIG. 2, the system 100 comprises at least one actuator 5 configured to continuously regulate a damping level $C_{ref}$ of the damper 4.

Preferably, each damper 4 the vehicle 1 is provided with is associated with an actuator 5 responsible for driving the respective damper 4.

The actuator 5 transduces the control signal into a mechanical, electrical or magnetic stimulus for continuously modifying the physical properties of the semi-active damper 4 which condition its response to the oscillations along the vertical axis of extension z of the corresponding wheel 3 and/or of the vehicle body 2.

The system 100 comprises at least a first sensor 6D, configured to measure at least one dynamic parameter of the vehicle 1 and send at least a first signal S1 containing an information item regarding the dynamic parameter.

Preferably, the at least first sensor 6D comprises at least one of the following:
an accelerometer 10 configured to measure an acceleration of the vehicle body 2 in proximity to one of the wheels 3 along a direction parallel to the vertical axis of extension z;
a potentiometer 11 configured to measure the compression of the damper 4 along its axis of extension;
a GPS sensor, configured to capture the position of the vehicle 1.

Also as illustrated, the system 100 comprises at least a second sensor 6C configured to capture an input entered by a driver of the vehicle 1 and to send at least a second signal S2 containing an information item regarding that input.

Preferably, the at least second sensor 6C comprises at least one of the following:
a steering angle sensor 12 configured to measure the steering angle δ determined by a steering wheel 13;
an accelerator sensor 14 configured to measure an action applied through a command from the accelerator 15;
a brake sensor 16 configured to measure an action applied through a command from the brake 17.

In other words, the second sensor 6C monitors the behaviour of the driver, whose actions are reflected (after a response interval) on the translational and oscillational movement of the vehicle 1, which is then monitored by the first sensor 6D.

Advantageously, the use of two different types of sensors, one to monitor the movement of the vehicle 1 and one to monitor the actions of the driver, allows predicting, through a model, the future dynamics of the vehicle 1, specifically the longitudinal and lateral accelerations the vehicle 1 is about to be subjected to.

The possibility of predicting the future dynamics of the vehicle 1 also ensures that the system 100 can preventively adapt the state of the damper 4 in order to guarantee driving comfort for the driver and, at the same time, good road holding.

Also as illustrated, the system 100 comprises a high-level control unit 8H in communication with the first sensor 6D and with the second sensor 6C.

The high-level control unit 8H is configured to calculate a nominal damping parameter $C_{nom}$ as a function of the first signal S1 and of the second signal S2.

The nominal damping parameter $C_{nom}$ represents the damping level that the damper 4 must apply when the vehicle body 2 or the respective wheel 3 is not subjected to oscillations along the vertical axis of extension z of the vehicle 1.

Advantageously, dependence on the second signal S2 received from the second sensor 6C allows the high-level control unit 8H to calculate the nominal damping level $C_{nom}$ also on the basis of the driver's actions, making it possible to anticipate and thus improve the response of the system 100 to the dynamics of the vehicle 1.

The system 100 further comprises a mid-level control unit 8M, in communication with the high-level control unit 8H and with the first sensor 6D.

The mid-level control unit 8M is configured to receive the nominal damping parameter $C_{nom}$ from the high-level control unit 8H and to calculate, through an algorithm or calculation routine A, a damping level $C_{ref}$ as a function of the first signal S1 received from the first sensor 6D.

In other words, the mid-level control unit 8M is in communication with the high-level control unit 8H, which parameterizes the algorithm A responsible for calculating the damping level $C_{ref}$ to be applied at the level of the damper 4.

The term parameterization of an algorithm is thus used to mean calculating a parameter which, when applied as input to an algorithm, influences the result of the algorithm in substantially the same way as an independent input variable (in our case, the signal S1).

The term algorithm is used to mean any calculation routine which, through a finite number of steps performed according to finite set of rules, allows obtaining the value for an output variable as a function of the input variables and/or of the input parameters.

In an embodiment, the system 100 comprises a mid-level control unit 8M for each damper 4 the vehicle 1 is provided with, so each mid-level control unit 8M is responsible for calculating the damping level $C_{ref}$ of a single damper 4.

Preferably, the high-level control unit 8H sends to the mid-level control unit 8M the nominal damping level $C_{nom}$, which constitutes an input variable in the algorithm A.

Thus, the algorithm A calculates the damping level $C_{ref}$ as a function of the first signal S1 received from the first sensor 6D and of the nominal damping parameter $C_{nom}$ received from the high-level control unit 8H.

Specifically, each mid-level control unit 8M executes the respective algorithm A to calculate, independently of the other mid-level control units 8M, the optimum damping level $C_{ref}$ for the damper 4 associated with it.

Advantageously, the presence of a mid-level control unit 8M for each damper 4 the o the vehicle 1 allows each damper 4 to execute the respective algorithm A differently and distinctly from the others.

The nominal damping level $C_{nom}$, calculated by the high-level control unit 8H, is sent to all the mid-level control units 8M.

In an embodiment, the same nominal damping level $C_{nom}$ is sent to the mid-level control units 8M and thus constitutes an input variable common to all the algorithms A, which are then executed independently by each mid-level control unit 8M to calculate the optimum damping level $C_{ref}$ for the damper 4 that each is associated with.

In another embodiment, a distinct and specific nominal damping level $C_{nom}$ is sent to each mid-level control unit 8M and constitutes an input variable of the respective algorithm A, which is thus executed independently of the other algorithms of the other mid-level control units 8M to calculate the optimum damping level $C_{ref}$ for the damper 4 that it is associated with.

The system 100 comprises a low-level control unit 8L, in communication with the mid-level control unit 8M and with the actuator 5 and configured to send a drive signal to the actuator 5.

More precisely, the low-level control unit 8L is configured to receive from the mid-level control unit 8M an information item containing the desired damping level $C_{ref}$ and to generate a corresponding drive signal for the actuator 5.

Preferably, the system 100 comprises a low-level control unit 8L for each actuator 5 the vehicle 1 is provided with, so each low-level control unit 8L is responsible for driving a single actuator 5.

In a preferred embodiment, the system 100 comprises a computerized calculation unit 7 in communication with the first sensor 6D, the second sensor 6C, the high-level control unit 8H and the mid-level control unit 8M.

The unit 7 is configured to process the first signal S1 from the first sensor 6D and the second signal S2 from the second sensor 6C.

The unit 7 is also configured to send at least one derived signal to the high-level control unit 8H and mid-level control unit 8M.

In other words, the unit 7 receives as input the raw data captured by the first sensor 6D and from the second sensor 6C and processes them, by filtering or integration, to derive other quantities used to calculate the damping level $C_{ref}$ to be applied to each damper 4 present in the vehicle 1.

In an embodiment comprising at least one accelerometer 10 and at least one potentiometer 11, the computerized calculation unit 7 processes the first signal S1 containing the information item from the accelerometer 10 and from the potentiometer 11 included in the system 100, to obtain a vertical speed of the vehicle body $z_c$ in proximity to the wheels 3 and a damper compression speed $z_d$.

In other words, from the accelerations captured by the accelerometer 10 and from the movements captured by the potentiometer 11, the computerized calculation unit 7 derives the vertical speed $z_c$ of the vehicle body in proximity to the wheel 3 and the compression speed $z_d$ of the damper by integration and differentiation (and filtrations, if necessary), respectively.

Described below is a preferred embodiment, illustrated in FIG. 2, where the damping level $C_{ref}$ of the damper 4 is calculated by the respective mid-level control unit 8M through the algorithm A as a function of the vertical speed $z_c$ of the vehicle body and the compression speed $z_d$ of the damper.

According to the convention adopted in this preferred embodiment, $z_c$ is defined as positive when the vehicle body 2 moves downwardly along the vertical axis of extension z and $z_d$ is defined as positive when the reference damper 4 is compressed.

In this embodiment, the algorithm A, executed by the respective mid-level control unit 8M, is defined as follows $$C_{ref} = \underset{C_{ref} \in [C_{min}, C_{max}]}{sat}(K_{sky}z_c z_d + C_{nom}),$$

where $C_{min}$ and $C_{max}$ are, respectively, a minimum value and a maximum value for the damping level $C_{ref}$ applicable to the damper 4, sat is a saturation function which restricts the dynamics of $C_{ref}$ to the range $[C_{min}, C_{max}]$ and where $K_{sky}$ is a parameter representing a gain of the algorithm A.

In other words, the function sat keeps the value $C_{ref}$ unchanged when $K_{sky}z_c z_d + C_{nom}$ falls within the range $[C_{min}, C_{max}]$ but applies $C_{ref} = C_{max}$ when $K_{sky}z_c z_d + C_{nom}$ is greater than $C_{max}$ and $C_{ref} = C_{min}$ when $K_{sky}z_c z_d + C_{nom}$, is greater than $C_{min}$.

Preferably, the gain $K_{sky}$ is selectable by the driver of the vehicle 1 from a finite number of values, corresponding to different vehicle attitude configurations.

The preferred embodiment of the system 100 illustrated in FIG. 2 comprises, in addition to the high-level control unit 8H, four mid-level control units 8M, four low-level control units 8L and four actuators 5 (one for each wheel 3 of the vehicle 1).

In this embodiment, the high-level control unit 8H and the four mid-level control units 8M calculate, respectively, the nominal damping levels $C_{nom,i}$ and the damping levels $C_{ref,i}$ (where i is a whole number from 1 to 4) independently for each wheel 3.

Advantageously, in this embodiment, the independence between the different values of nominal damping $C_{nom,i}$ and damping $C_{ref,i}$ allow optimum adjustment of the attitude of the vehicle 1.

Advantageously, use of the algorithm A allows regulating the damping level $C_{ref}$ more uniformly, for added comfort, compared to traditional skyhook algorithms with two stages.

In effect, traditional skyhook algorithms calculate the damping level $C_{ref}$ as a function of the vertical speed $z_c$ of the vehicle body and of the speed of compression $z_d$ of the damper as follows $$C_{ref} = \begin{cases} C_{min} & se \ z_c z_d \leq 0, \\ C_{max} & se \ z_c z_d > 0. \end{cases}$$

This way of handling damper operation causes unwanted jolting when the speeds involved are almost zero, since minor variations, for example caused by sensor noise, result in numerous changes between the two states allowable by the damping level.

Figure 3:
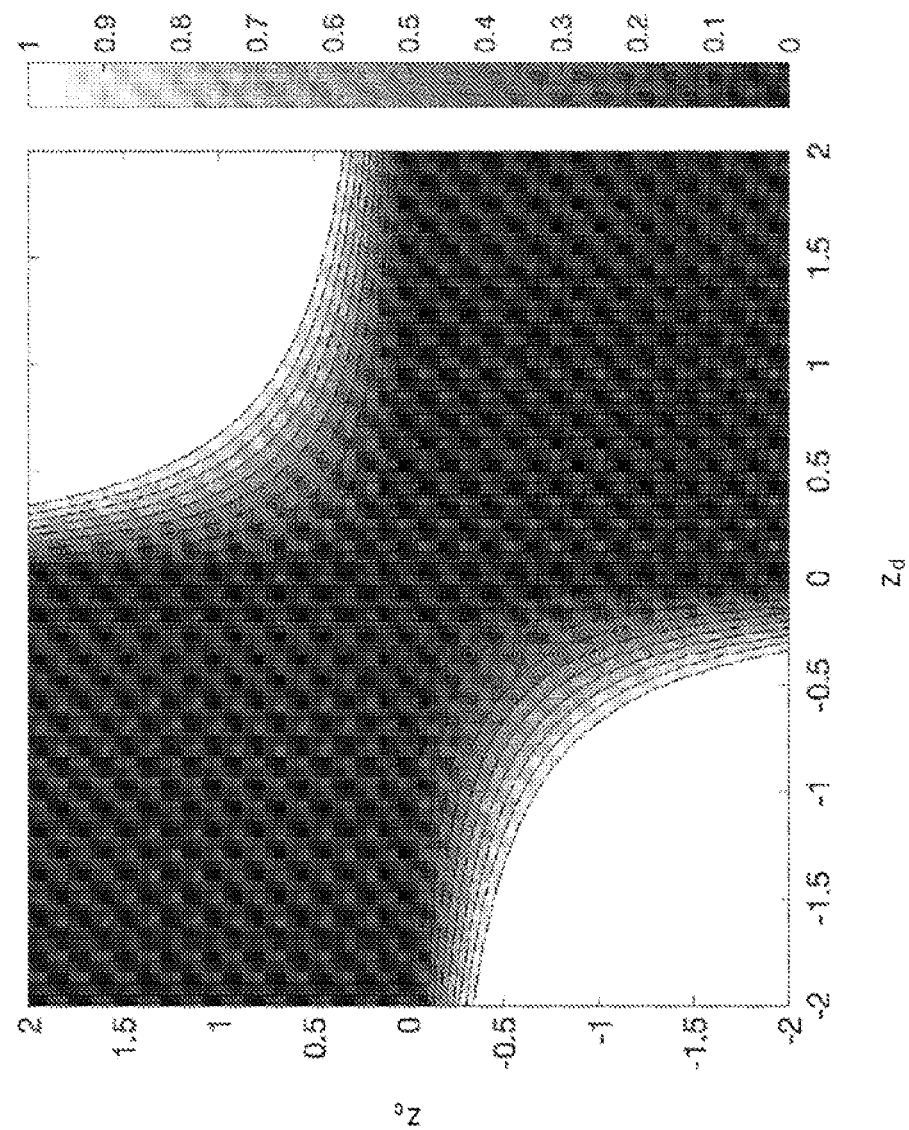
FIG. 3 illustrates through a greyscale map the match between the dynamic parameters of the vehicle and the damping level.

In the embodiment proposed and illustrated in FIG. 3 in the configuration where $C_{nom}=0$, small variations in the speed values $z_c$ and $z_d$ cause only slight variations in the damping value $C_{ref}$, thus cancelling the jolts caused by the changes of state in the traditional implementations of skyhook algorithms.

Advantageously, the use of this more uniform variant of a skyhook algorithm ensures a wider variety of adjustments of the damping level $C_{ref}$ of the damper 4 (which can adapt better to the jolts of the vehicle 1), thus improving the driving comfort for the driver.

The parameter $C_{nom}$ is calculated by the high-level control unit 8H as a function of the first signal S1 and second signal S2 (if necessary, processed by the computerized calculation unit 7) and transmitted to the mid-level control unit 8M.

As described above, the nominal damping parameter $C_{nom}$ is a damper parameter to be applied to the dampers when there are no oscillations (that is, when $z_c=0$ or $z_d=0$).

Again in accordance with the preferred embodiment, the nominal damping parameter $C_{nom}$ is obtained by the high-level control unit 8H through the following relation $$C_{nom}=C_0+C_{lat}+C_{long},$$

where $C_0$ is a default nominal damping level, applied when there are no longitudinal or lateral accelerations of the vehicle 1, and where $C_{lat}$ and $C_{long}$ are, respectively, a first additive factor and a second additive factor, both calculated by the high-level control unit 8H as a function of the first signal S1 and of the second signal S2.

The first additive factor $C_{lat}$ and the second additive factor $C_{long}$ which take into account the dynamics of lateral acceleration and longitudinal acceleration of the vehicle 1, respectively.

Preferably, the default nominal damping level $C_0$ is selectable by the driver of the vehicle 1 from a finite number of values, corresponding to different attitude configurations of the vehicle 1.

More specifically, in this preferred embodiment, the first additive factor $C_{lat}$ is calculated by the high-level control unit 8H as follows $$C_{lat}=K_{lat}A_{y,HP},$$

where $K_{lat}$ is an adjustable gain factor and $A_{y,HP}$ is a version, filtered preferably by a high pass band filter, of the quantity $$A_y = \left\| \frac{v^2 \delta}{K_{us}v^2 + L} \right\|,$$

where v is a speed of movement of the vehicle 1, $K_{us}$ is a steering reference coefficient and L is a model parameter describing the length of the wheelbase of the vehicle 1. Preferably, the speed of movement v is derived by the computerized calculation unit 7 by processing at least a first signal S1 captured and sent by the GPS sensor the vehicle 1 is provided with.

Again in accordance with the preferred embodiment the second additive factor $C_{long}$ is calculated by the high-level control unit 8H as follows $$C_{long}=K_{long}A_{x,HP},$$

where $K_{long}$ is an adjustable gain factor and $A_{x,HP}$ is a version, filtered preferably by a high pass band filter, of the quantity $$A_x = -\frac{\rho S C_x v^2}{2m} + k_{bk}P_{bk} + k_{pos}\frac{T_{eng,pos}\omega_{eng}}{v} + k_{neg}\frac{T_{eng,neg}\omega_{eng}}{v},$$

where $\rho$ is an air density, S is a front surface of the vehicle 1, $C_x$ is an aerodynamic friction coefficient of the vehicle 1, m is a mass of the vehicle 1, v is the speed of movement of the vehicle 1, $k_{bk}$ is a braking efficiency, $P_{bk}$ is a pressure on the brake control 17 measured by the brake sensor 16, $k_{pos}$ is a first model parameter describing the efficiency of the propelling unit, $k_{neg}$ is a second model parameter describing the efficiency of the propelling unit, $T_{eng,pos}$ is a positive parameter describing a positive torque of the engine, $T_{eng,neg}$ is a negative parameter describing a negative torque of the engine and $\omega_{eng}$ is a parameter describing a number of revolutions of the engine of the vehicle 1.

Preferably, when $T_{eng,neg}$ is greater than 0, then $T_{eng,neg}$ is equal to 0 and when $T_{eng,neg}$ is less than 0, then $T_{eng,neg}$ is equal to 0, respectively. In other words, it is impossible for both of the last two addends in the preceding equation to contribute simultaneously to the calculating of $A_x$.

Advantageously, the presence of the first additive factor $C_{lat}$ and of the second additive factor $C_{long}$ allows the stability control system 100 to take into account the rolling and pitching dynamics of the vehicle 1, respectively.

Still more advantageously, the fact that the nominal damping level $C_{nom}$ (thus calculated by adding the first additive factor $C_{lat}$ and the second additive factor $C_{long}$) parameterizes the algorithm A allows driving comfort and road holding to be managed simultaneously in the presence of both rolling and pitching dynamics.

In effect, the addition of the nominal damping level $C_{nom}$ calculated by the high-level control unit 8H, allows the mid-level control unit 8M to execute the algorithm A with a vehicle attitude previously optimized as a function of the second signal S2, that is, as a function of the inputs entered by the driver.

Also defined according to the invention is a method 200 for controlling the stability of a vehicle 1 having a longitudinal axis of extension x, a transverse axis of extension y and a vertical axis of extension z and comprising a body 2, a plurality of wheels 3 and, for each wheel 3, at least one semi-active damper 4 interposed between the respective wheel 3 and the body 2.

The method 200 comprises a first step of measuring 201, for capturing a dynamic parameter of the vehicle 1.

The first step of measuring 201 for capturing a dynamic parameter of the vehicle 1 comprises at least one of the following sub-steps:

measuring at least one acceleration of the body 2 in proximity to the wheels 3 along a direction parallel to the vertical axis z of the vehicle 1;

measuring at least one compression of the dampers 4 along a direction nearly parallel to the vertical axis z.

Preferably, in an embodiment comprising at least the measuring of the acceleration of the vehicle body 2 and the measuring of the compression of the dampers 4, the first step of measuring 201 comprises at least one sub-step of processing the dynamic parameters of the vehicle 1 to calculate a vertical speed $z_c$ of the vehicle body in proximity to the wheels 3 and a speed of compression $z_d$ of the dampers.

After the first step of measuring 201, the method 200 comprises a second step of measuring 202 for capturing an input entered by the driver of the vehicle 1.

Preferably, the second step of measuring 202 for capturing an input entered by the driver of the vehicle 1 comprises at least one of the following sub-steps:

measuring the steering angle δ determined by a steering wheel 13;

measuring an action of acceleration applied through a command from the accelerator 15;

measuring an action of braking applied through a command from the brake 16.

Next, the method 200 comprises a step 203 of executing an algorithm A to calculate a damping level $C_{ref}$ for the damper 4 as a function of the dynamic parameter captured in the first step of measuring 201 and of the input captured in the second step of measuring 202.

In a preferred embodiment comprising at least the measuring of the acceleration of the vehicle body 2, the measuring of the compression of the dampers 4, and the sub-step of processing the dynamic parameters of the vehicle 1, the step 203 of executing comprises executing the algorithm A defined as $$C_{ref} = \underset{C_{ref} \in [C_{min}, C_{max}]}{sat} (K_{sky} z_c z_d + C_{nom}),$$

where $C_{min}$ and $C_{max}$ are, respectively, a minimum value and a maximum value for the damping level $C_{ref}$, sat is a saturation function which restricts the dynamics of $C_{ref}$ to the range $[C_{min}, C_{max}]$ and where $K_{sky}$ and $C_{nom}$ are two adjustable parameters representing, respectively, a gain of the algorithm A and a nominal damping level in the absence of vertical body speed $z_c$ or damper compression speed $z_d$.

Preferably, the nominal damping level $C_{nom}$ is calculated as a function of the dynamic parameters of the vehicle 1 captured during the first step of measuring 201 and of the input captured during the second step of measuring 202.

The invention claimed is:

1. A system for controlling a stability of a vehicle having a longitudinal axis of extension, a transverse axis of extension and a vertical axis of extension and comprising a body, a plurality of wheels and, for each wheel, a semi-active damper interposed between the respective wheel and the body; the control system comprising:

an actuator configured to continuously regulate a damping level ($C_{ref}$) of the semi-active damper;

a first sensor, configured to measure a dynamic parameter of the vehicle and send a first signal containing an information item regarding the dynamic parameter;

a second sensor configured to measure an input entered by a driver of the vehicle and to send a second signal containing an information item regarding the input;

a high-level control unit in communication with the first sensor and with the second sensor and configured to receive the first signal and the second signal;

a mid-level control unit in communication with the high-level control unit and with the first sensor to receive the first signal;

a low-level control unit, in communication with the actuator and with the mid-level control unit and configured to send a drive signal to the actuator;

wherein the high-level control unit is configured to parameterize, as a function of the first signal and of the second signal, an algorithm executed by the mid-level unit, to calculate the damping level ($C_{ref}$) as a function of the first signal; and a computerized calculation unit in communication with the first sensor, the second sensor, the high-level control unit and the mid-level unit; the computerized calculation unit being configured to process the first signal and the second signal and to a quantity derived from the first signal and the second signal to the high-level control unit and to the mid-level control unit.

2. The system according to claim 1, wherein the first sensor comprises at least one chosen from the following:

an accelerometer configured to measure an acceleration of the body in proximity to the respective wheel along a direction parallel to a vertical axis of extension;

a potentiometer configured to measure a compression of the semi-active damper along a direction parallel to the vertical axis of extension; and wherein the second sensor comprises at least one chosen from the following:

a steering angle sensor configured to measure a steering angle (δ) determined by a steering wheel;

an accelerator sensor configured to measure an action applied through a command from an accelerator;

a brake sensor configured to measure an action applied through a command from a brake.

3. The system according to claim 1, wherein the first sensor comprises at least the potentiometer and the accelerometer, the computerized calculation unit being configured to calculate a vertical speed of the body ($z_c$) in proximity to the wheel and a damper compression speed ($z_d$) as a function of the first signal containing at least one information item from the accelerometer and from the potentiometer.

4. The system according to claim 3, wherein the damping level ($C_{ref}$) of the semi-active damper is calculated by the mid-level control unit based on the vertical speed of the body ($z_c$) and on the damper compression speed ($z_d$).

5. The system according to claim 4, wherein the damping level ($C_{ref}$) of the semi-active damper is calculated by the mid-level control unit using an algorithm defined as $$C_{ref} = \underset{C_{ref} \in [C_{min}, C_{max}]}{sat} (K_{sky} z_c z_d + C_{nom}),$$

where ($C_{min}$) and ($C_{max}$) are, respectively, a minimum value and a maximum value for the applicable damping level ($C_{ref}$) and wherein ($K_{sky}$) and ($C_{nom}$) are two adjustable parameters representing, respectively, a gain of the algorithm and a nominal damping level in an absence of vertical body speed ($z_c$) or damper compression speed ($z_d$).

6. The system according to claim 5, wherein the nominal damping level ($C_{nom}$) is calculated by the high-level control unit as follows $$C_{nom} = C_0 + C_{lat} + C_{long},$$

wherein ($C_0$) is a default nominal damping level and wherein ($C_{lat}$) and ($C_{long}$) are, respectively, a first additive factor and a second additive factor, both calculated by the high-level control unit as a function of the first signal and of the second signal.

7. The system according to claim 6, wherein the first additive factor ($C_{lat}$) is calculated as follows $$C_{lat} = K_{lat} A_{y,HP},$$

where ($K_{lat}$) is an adjustable gain factor and ($A_{y,HP}$) is a filtered version of the quantity $$A_y = \left\| \frac{v^2 \delta}{K_{us} v^2 + L} \right\|,$$

wherein (v) is a speed of movement of the vehicle, ($K_{us}$) is a steering reference coefficient and (L) is a parameter describing a length of the wheelbase of the vehicle.

8. The system according to claim 6, wherein the second additive factor ($C_{long}$) is calculated as follows $$C_{long} = K_{long} A_{x,HP},$$

where ($K_{long}$) is an adjustable gain factor and ($A_{x,HP}$) is a filtered version of the quantity $$A_x = -\frac{\rho S C_x v^2}{2m} + k_{bk} P_{bk} + k_{pos} \frac{T_{eng,pos} \omega_{eng}}{v} + k_{neg} \frac{T_{eng,neg} \omega_{eng}}{v},$$

wherein ($\rho$) is an air density, is a front surface of the vehicle, ($C_x$) is an aerodynamic friction coefficient of the vehicle, (m) is a mass of the vehicle, (v) is a speed of movement of the vehicle, ($k_{bk}$) is a braking efficiency, ($P_{bk}$) is a pressure on a brake control measured by a brake sensor, ($k_{pos}$) is a first model parameter describing an efficiency of the propelling unit, ($k_{neg}$) is a second model parameter describing the efficiency of the propelling unit, ($T_{eng,pos}$) is a parameter describing a positive torque of an engine of the vehicle, ($T_{eng,neg}$) is a parameter describing a negative torque of the engine and ($\omega_{eng}$) is a parameter describing a number of revolutions of the engine.

9. The system according to claim 1, wherein the semi-active damper is a magnetorheological damper.

10. A method for controlling a stability of a vehicle having a longitudinal axis of extension, a transverse axis of extension and a vertical axis of extension and comprising a body, a plurality of wheels and, for each wheel, a semi-active damper interposed between the respective wheel and the body; the method comprising the following:
a first step of measuring, for capturing a dynamic parameter of the vehicle;
a second step of measuring, for capturing an input entered by a driver of the vehicle;
a step of executing an algorithm to calculate a damping level ($C_{ref}$) for the semi-active damper as a function of the dynamic parameter and of the input;
a step of implementing the damping level ($C_{ref}$), calculated by the algorithm, by an actuator which is operatively connected to the semi-active damper;
wherein the first step of measuring for capturing the dynamic parameter of the vehicle comprises at least one of the following sub-steps:
measuring at least one acceleration of the body in proximity to the wheels along a direction parallel to a vertical axis of the vehicle;
measuring at least one compression of the semi-active dampers along a direction nearly parallel to the vertical axis.

11. The method according to claim 10, wherein the first step of measuring comprises at least a sub-step of measuring at least one acceleration of the body and a sub-step of measuring at least one compression of the semi-active dampers, the first step of measuring comprising a sub-step of processing the dynamic parameters of the vehicle to calculate a vertical speed ($z_c$) of the body in proximity to the wheels and a speed of compression ($z_d$) of the semi-active dampers.

12. The method according to claim 11, wherein the step of executing comprises executing the algorithm defined as $$C_{ref} = \underset{C_{ref} \in [C_{min}, C_{max}]}{sat} (K_{sky} z_c z_d + C_{nom}),$$

where ($C_{min}$) and ($C_{max}$) are, respectively, a minimum value and a maximum value for the applicable damping level ($C_{ref}$) and wherein ($K_{sky}$) and ($C_{nom}$) are two adjustable parameters representing, respectively, a gain of the algorithm and a nominal damping level in an absence of the vertical body speed ($z_c$) or of the damper compression speed ($z_d$).

13. The method according to claim 12, wherein the parameter ($C_{nom}$) is calculated as a function of the dynamic parameter of the vehicle captured during the first step of measuring and of the input captured during the second step of measuring.

14. The method according to claim 10, wherein the second step of measuring for capturing the input entered by the driver of the vehicle comprises at least one of the following sub-steps:
measuring a steering angle ($\delta$) determined by a steering wheel;
measuring an action of acceleration applied through a command from an accelerator;
measuring an action of braking applied through a command from a brake.

* * * * *